US00RE46869E

(19) United States
(12) Reissued Patent
Yassa

(10) Patent Number: US RE46,869 E
(45) Date of Reissued Patent: May 22, 2018

(54) METHOD AND APPARATUS TO BROADCAST CONTENT TO HANDHELD WIRELESS DEVICES VIA DIGITAL SET-TOP RECEIVERS

(71) Applicant: Fathy Yassa, Soquel, CA (US)

(72) Inventor: Fathy Yassa, Soquel, CA (US)

(21) Appl. No.: 14/225,847

(22) Filed: Mar. 26, 2014

Related U.S. Patent Documents

Reissue of:
(64) Patent No.: 8,145,124
Issued: Mar. 27, 2012
Appl. No.: 12/077,071
Filed: Mar. 13, 2008

U.S. Applications:
(63) Continuation of application No. 10/839,783, filed on Apr. 27, 2004, now abandoned.

(60) Provisional application No. 60/465,986, filed on Apr. 28, 2003.

(51) Int. Cl.
*H04N 7/16* (2011.01)
*H04N 21/434* (2011.01)
*H04N 21/4363* (2011.01)
*H04N 21/41* (2011.01)

(52) U.S. Cl.
CPC ..... *H04N 7/163* (2013.01); *H04N 21/4126* (2013.01); *H04N 21/4344* (2013.01); *H04N 21/43637* (2013.01)

(58) Field of Classification Search
USPC ..... 725/151, 153, 147, 133, 141, 142, 143; 455/3.04, 3.01, 3.06, 123, 414.1
See application file for complete search history.

(56) References Cited

U.S. PATENT DOCUMENTS

| | | | | |
|---|---|---|---|---|
| 6,097,441 | A | 8/2000 | Allport | |
| 6,557,031 | B1 | 4/2003 | Mimura et al. | |
| 6,738,421 | B1 | 5/2004 | Ueno | |
| 7,302,224 | B2 | 11/2007 | Sibley et al. | |
| 7,336,925 | B2 * | 2/2008 | Zilliacus | 455/41.2 |
| 7,360,232 | B2 | 4/2008 | Mitchell | |
| 7,390,431 | B2 | 6/2008 | Faryniarz et al. | |
| 7,433,414 | B2 * | 10/2008 | Nguyen et al. | 375/260 |
| 7,441,260 | B1 | 10/2008 | Kurapati | |
| 7,590,991 | B2 * | 9/2009 | Arad et al. | 725/15 |

(Continued)

FOREIGN PATENT DOCUMENTS

WO 0193461 A1 12/2001

OTHER PUBLICATIONS

Cover page of WO 03/015414 Published Feb. 20, 2003.*

(Continued)

*Primary Examiner* — Fred Ferris, III
(74) *Attorney, Agent, or Firm* — Sughrue Mion, PLLC

(57) ABSTRACT

Delivery of programming from a content provider to one or more hand held devices is effected via a set-top box (STB). The STB receives a transport stream, recognizes and de-multiplexes out a co-cast content association table containing a list of all available co-cast programming, and broadcasts table to the one or more hand held devices. Each hand held device displays the list and a program therefrom is selected. The selection is transmitted to the STB, which de-multiplexes out the selection from the delivered programming, and re-multiplexes the requested co-cast programming into a transport stream for broadcast to the requesting hand held device.

20 Claims, 8 Drawing Sheets

(56) References Cited

U.S. PATENT DOCUMENTS

| | | | | |
|---|---|---|---|---|
| 7,634,296 | B2 * | 12/2009 | Haeusel | 455/557 |
| 7,634,794 | B1 | 12/2009 | Paik et al. | |
| 7,675,901 | B2 | 3/2010 | Wang et al. | |
| 7,751,477 | B2 * | 7/2010 | Kwentus et al. | 375/240.07 |
| 8,082,572 | B1 | 12/2011 | Tilford | |
| 8,145,124 | B2 | 3/2012 | Yassa | |
| 2002/0129368 | A1 | 9/2002 | Schlack et al. | |
| 2002/0147984 | A1 | 10/2002 | Tomsen et al. | |
| 2002/0184314 | A1 | 12/2002 | Riise | |
| 2003/0046431 | A1 | 3/2003 | Belleguie | |
| 2003/0061077 | A1 | 3/2003 | Sagar | |
| 2003/0077065 | A1 | 4/2003 | Scholten et al. | |
| 2003/0135860 | A1 | 7/2003 | Dureau | |
| 2004/0117857 | A1 | 6/2004 | Bisdikian et al. | |
| 2004/0155985 | A1 | 8/2004 | Dethier | |
| 2004/0203374 | A1 * | 10/2004 | Zilliacus | 455/41.2 |
| 2004/0252562 | A1 | 12/2004 | Kim | |
| 2005/0095980 | A1 * | 5/2005 | Chang | 455/3.02 |
| 2005/0108751 | A1 | 5/2005 | Dacosta | |
| 2005/0174488 | A1 | 8/2005 | Chennakeshu | |
| 2005/0177861 | A1 | 8/2005 | Ma et al. | |
| 2006/0032905 | A1 | 2/2006 | Bear et al. | |
| 2006/0062200 | A1 * | 3/2006 | Wang | H04L 12/1836 370/352 |
| 2006/0062314 | A1 | 3/2006 | Palin et al. | |
| 2008/0261514 | A1 * | 10/2008 | Pratt et al. | 455/3.06 |
| 2008/0305802 | A1 * | 12/2008 | Barnes et al. | 455/445 |
| 2009/0298535 | A1 * | 12/2009 | Klein et al. | 455/556.1 |

OTHER PUBLICATIONS

Overview of MPEG-2 Systems, Broadcast Technology, No. 11, NHK STRL, Summer 2002.*
U.S. Appl. No. 13/411,323.
U.S. Appl. No. 12/080,825.

* cited by examiner

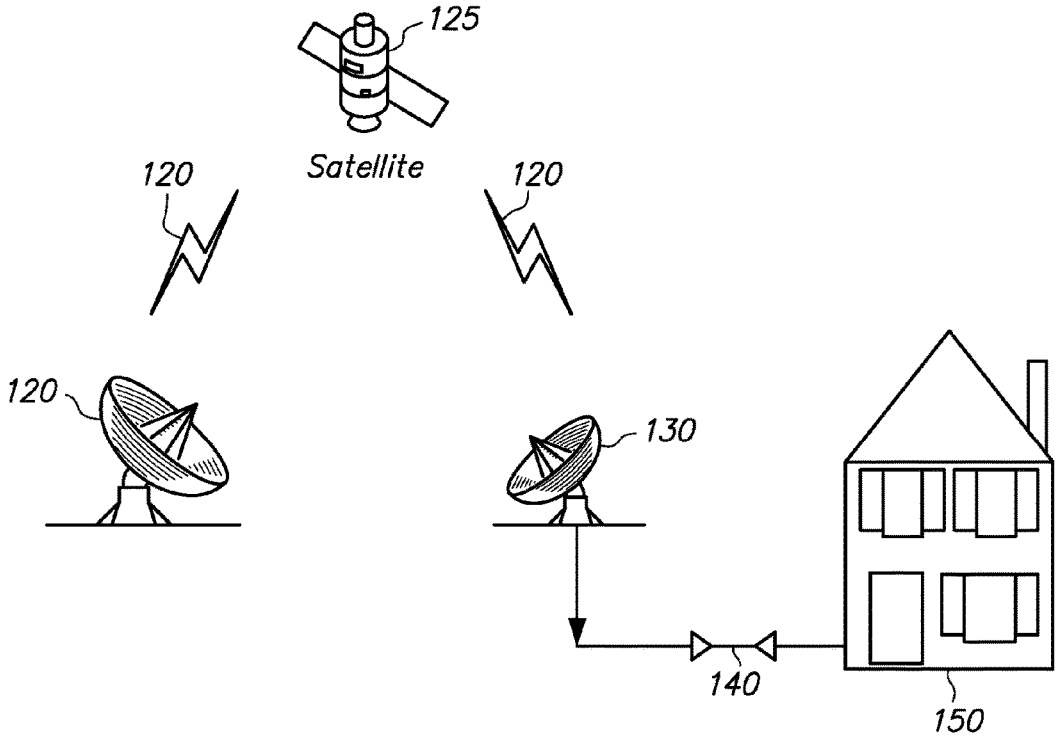
FIG. 1 - Prior Art

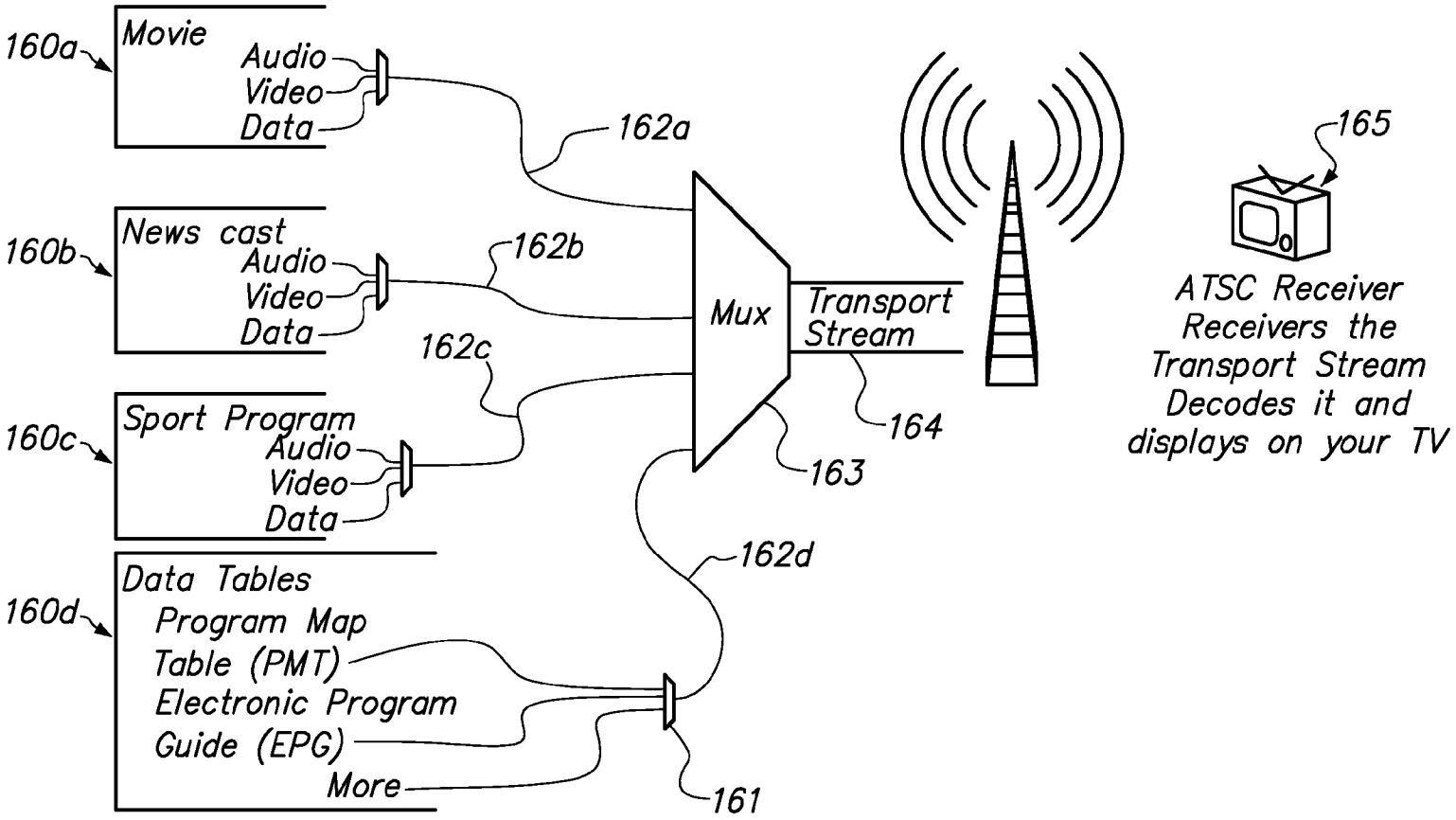
FIG. 1a - Prior Art

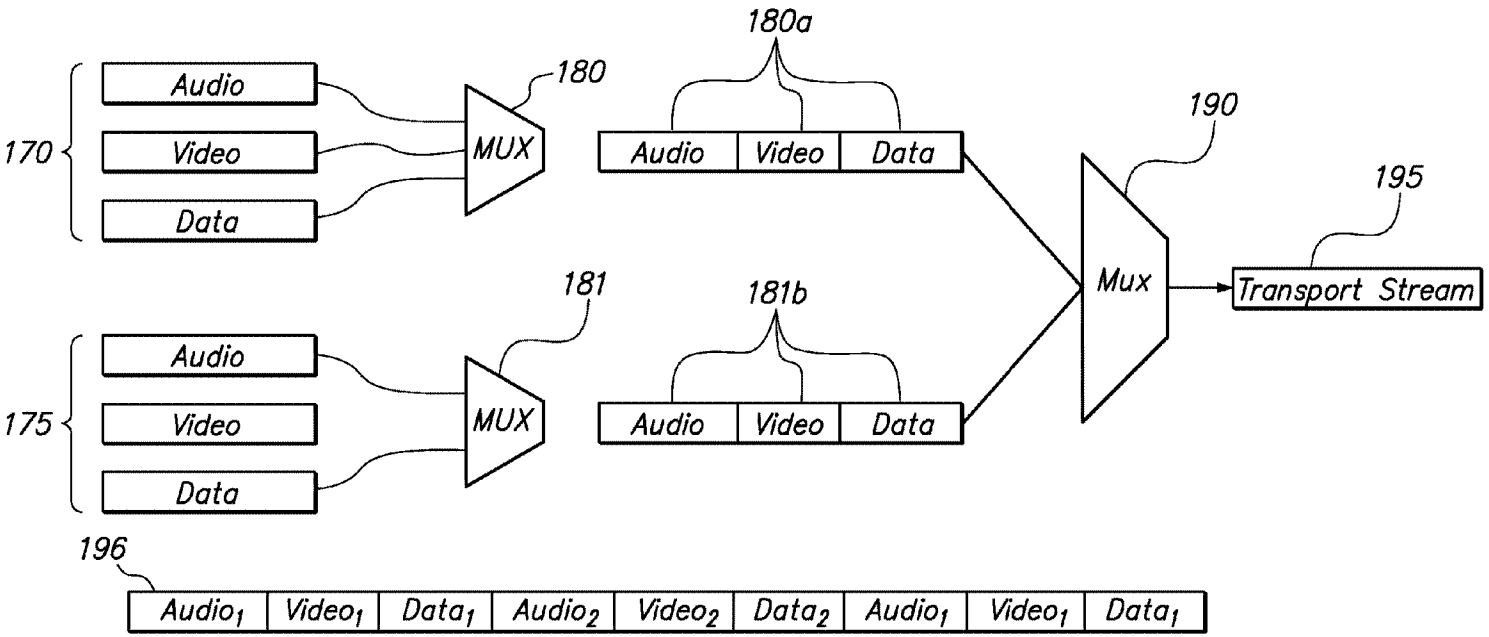
FIG. 1b - Prior Art
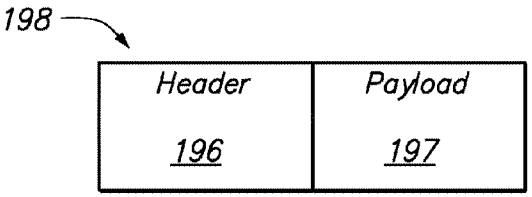
FIG. 1c - Prior Art

METHOD AND APPARATUS TO BROADCAST CONTENT TO HANDHELD WIRELESS DEVICES VIA DIGITAL SET-TOP RECEIVERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM OF PRIORITY

The present [invention claims priority from regular application Ser. No. 10/839,783 filed on Apr. 27, 2004 and incorporates said application by reference as if fully set forth herein] *application is a reissue application of U.S. patent application Ser. No. 12/077,071, filed on Mar. 13, 2008, in the U.S. Patent and Trademark Office, now U.S. Pat. No. 8,145,124, which is a continuation of U.S. application Ser. No. 10/839,783, filed on Apr. 27, 2004, in the U.S. Patent and Trademark Office, which claims the benefit of U.S. Provisional Application No. 60/465,986, filed on Apr. 28, 2003, in the U.S. Patent and Trademark Office, the disclosures of which are incorporated herein by reference in their entireties.*

FIELD OF THE INVENTION

The invention herein discloses an exemplary method and apparatus to transmit content to a viewer's wireless hand held device as an alternative or complement to TV viewing, using a digital satellite, cable or terrestrial set-top-box, an interne enabled set-top box, or an analog broadcast with digital extraction and a wireless reception device.

BACKGROUND

Referring to FIG. 1, currently the vast majority of digital television program providers, whether cable, satellite, or terrestrial transmissions, transmit digital content from transmitting station 110 to satellite 125 via channel 120. Satellite 125 retransmits the digital content digital to one or more satellite dishes 130. Satellite dish 130 may be a large satellite dish owned and operated by a local cable company, or it may a personal satellite dish serving one home. The satellite dish then transmits the content, usually via bi-directional coaxial cable 140, to each cable subscriber via set-top-box (STB) 150. STB 150 demodulates, or extracts information from, the digital signal in the form of packets, or fragments, from the carrier, and performs different signal processing techniques, i.e. error correcting, demultiplexing, descrambling and decoding to decode the digital programs in the form of video, audio or data, and converts such digital data to analog form to playback such decoded signals on a TV set as shown in FIG. 1. Such connection between the playback device (TV) and the STB are done with cables and use the analog signals produced by the STB.

Today, the relationship between a traditional set top box and a hand held device is limited to hand held devices, and more specifically, only personal video devices, downloading, for later viewing, the content which is currently being viewed from the set top box.

The instant invention represents an improvement over wide area hand held receivers utilizing the DVB-H or DMB standards. DVB-H, or Digital Video Broadcasting, refers to the hand held version of DVB-T or Digital Video Broadcasting-Terrestrial, which is a system for the Terrestrial broadcast of signals destined for playback on hand held devices. DMB, or Digital Multimedia Broadcast, is a digital radio transmission system for sending multimedia (radio, TV, and datacasting) to mobile devices such as mobile phones.

The current system has proven inadequate for most wireless applications, and in particular, to mobile wireless devices. Mobile wireless devices generally fall under the category of hand held devices, and include cell phones, personal digital assistants (pda's), etc. These devices share the common characteristic of being small, easily transported, and useable under most circumstances. Unlike portable computers and other larger mobile devices, hand-held devices do not require a surface to be placed on, nor do they usually have fixed or removable, mass storage devices such as hard drives, magneto-optical drives, or optical drives. The storage is generally limited to on-board memory or small removable memory such as flash media cards.

The difficulty with transmitting content, and in particular, rich media, defined as content exhibiting one or more characteristics of user interaction, advanced animation, and or audio/video is that it requires large bandwidth and bi-directional communication for error correction. Small, wireless devices generally do not have the available bandwidth or sufficient power to reach the content distributor to request that corrupted packets of information be resent. Also, current systems do not provide a practical means for reasonable interaction between a hand held device and a television program.

In the present invention, digital data encoded to be received by one or more handheld devices for playback is inserted into the transport stream by the content provider and is transmitted via satellite, cable or terrestrial television digital channels to a STB and wirelessly re-transmitted to a handheld receiver for decoding and playback using modern forms of wireless transmission such as Bluetooth, infrared, fast-infrared (FIR) or 802.11x. Such data can be digitally compressed audio, video, program information, hypertext links, game files, etc.

In the present invention, the set-top box obtains instructions from the wireless device regarding what content to transmit to it. The STB uses the index data supplied by the broadcaster embedded in the data stream to determine what content to transmit.

BRIEF SUMMARY OF THE INVENTION

The instant invention relates to an exemplary method and apparatus for delivering rich media to wireless hand held devices which do not have sufficient power or bandwidth to obtain the content directly from a content provider. The instant invention solves this problem by sending the rich media to an STB which re-transmits the rich media to the wireless hand held device.

BRIEF DESCRIPTION OF THE DRAWINGS

FIG. 1 illustrates how the average end-user receives digital television programming.

FIG. 1a illustrates a high level schematic diagram of how digital content is processed for transmission to an end-user.

FIG. 1b, is an example of a lower level schematic diagram of the creation of a Transport Stream from packetized elementary streams.

FIG. 1c, illustrates a simplified, sample, MPEG compliant packet.

DETAILED DESCRIPTION OF THE EMBODIMENTS

Figure 2:
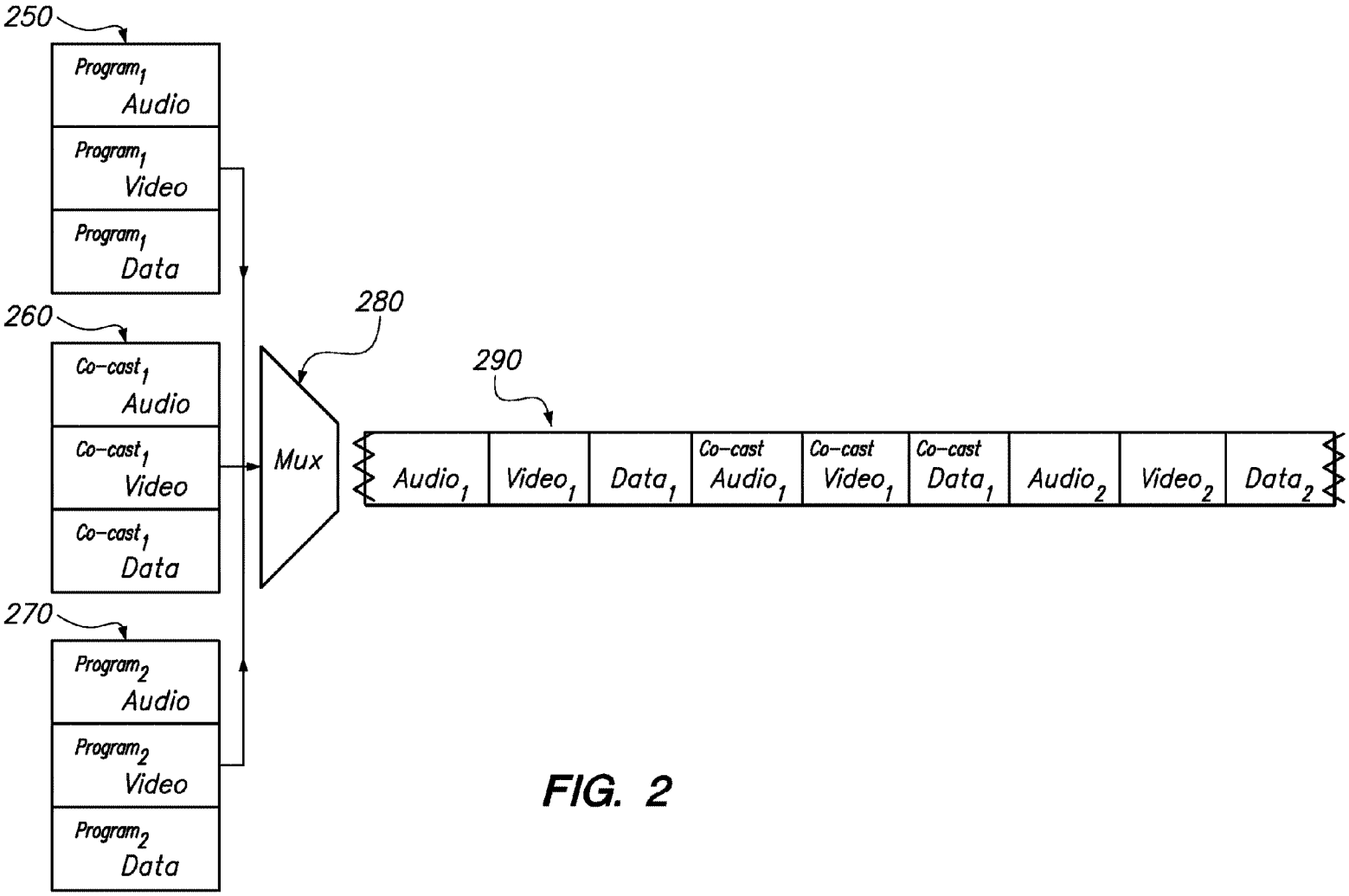
FIG. 2 illustrates an example of how co-cast programming is multiplexed with regular digital programming.

The invention herein disclosed provides an exemplary solution to the problem of delivering rich media to wireless devices, and in particular to small hand held wireless devices for the purpose of interactive television, more recently known as participation television. This is accomplished by wirelessly enabling STB devices so that they can wirelessly transmit rich media to one or more hand held wireless devices for final storage and playback while simultaneously transmitting broadcast quality content to a television set. The rich media transmitted to the wireless hand held device is known as Co-Cast information. For purposes of this disclosure, co-cast content refers to content which is inserted into the transport stream and intended for playback on devices other than a television set, e.g. wireless handheld device, laptop, personal, computer, pda, or mobile phone. Generally, co-cast information bears a logical relationship to the content that is being displayed on the television set, although that is not required. Alternatively, co-cast information may be wholly independent of the channel being displayed on the television set. Such co-cast information is defined here as the globally available co-cast content. The broadcaster who inserted the co-cast content into the transport stream may also place restrictions on its use. Some restriction may include, a limited period of time for accessibility, another example may include a geographic limitations, etc. An example of a limited time usage would be co-cast programming which directs the viewer to a voting website. Some of the more popular wireless protocols include infra-red, fast infra-red, and 802.11x.

In another embodiment of the invention, the STB has multiple output designed for wired connectivity, each output being capable of transmitting different content.

Referring to FIG. 1a, FIG. 1a illustrates a high level schematic diagram of how digital content is processed for transmission to an end-user. Rich media, e.g. Content 160a, a movie, Content 160b a news cast, Content 160c, a Sports Program, and Content 160d, Data Tables, is first encoded as elementary streams. An elementary stream is the output of a video or audio encoder, and may only contain one type of data, e.g. audio, video, etc. In the MPEG communications protocol, elementary streams are packetized, i.e. broken down into smaller pieces, i.e. packets. In a traditional MPEG system, each transport packet is 188 bytes in length and contains a header, and a payload. The header contains such index information as time index, program identifier, and payload type (whether audio, video, program information, etc.). In addition to being packetized, the various elementary streams of each program are combined or multiplexed (161) into Packetized Elementary Streams 162a, 162b, 162c, and 162d. Each Packetized Elementary Stream contains the combined data (audio, video, date, etc.) of a single program, i.e. Content 160a, 160b, 160c, or 160d. When the packets reach the set top box, the set top box demultiplexes, i.e. recombines the packets into single programs, based upon the header information and is able to present the original content to the display unit. The demultiplexer also ensures the desired packets are displayed in the correct chronological order.

Each Packetized Elementary Stream is then further multiplexed (163) into single Transport Stream 164 carrying packets from each Packetized Elementary Stream 162a et al. A transport stream contains packetized data from multiple programs. Transport Stream 164 is broadcast to the consumer and received by the consumer's set top box, STB 165, which demultiplexes Transport Stream 164.

Referring to FIG. 1b, FIG. 1b, is an example of a lower level schematic diagram of the creation of a Transport Stream from packetized elementary streams. Elementary Stream 170 represents Program 1. Elementary Stream 175 represents a different program, i.e. Program 2. Multiplexer 180 multiplexes or combines the three elementary streams that compose the audio, video, and data of Program 1 into Single Packetized Elementary stream 180a. Similarly, multiplex 181, multiplexes or combines the three elementary stream that compose the audio, video, and data, of Program 2 into single Packetized Elemental Stream 181a.

Multiplexer 190 combines both Packetized Elementary Streams 180a and 181a into Single Transport Stream 195 which is what is actually broadcast or transmitted to the end user's STB.

Referring to FIG. 1c, FIG. 1c, illustrates a simplified, sample, MPEG compliant packet. Packet 198 is composed of 2 sections, Header 196 and Payload 197.

The content provider, i.e. Cable Company, Satellite Company, network, studio, etc. may elect to insert Co-Cast information into the transport stream. Like any other information in the transport stream, co-cast information would be packetized with a header and payload. The header would include the traditional information associated with an MPEG header. However, in addition, the header of co-cast information would include an identifier that the packet is a co-cast packet. The payload of the co-cast packet is similar to the payload of a traditional MPEG packet except that it may also include hypertext links, which is not traditionally seen in MPEG packets.

In a regular MPEG based digital television system, the set top box knows the channel line-up by reading the Payload of the Program Association Table. Said Program Association Table traditionally has a program identifier set to ZERO. In the instant invention, available co-cast content is determined by the STB by reading the payload of the Co-Cast Content Association Table, which is analogous to the Program Association Table. The Co-Cast Content Association Table is identified by the Program Identifier in the header.

Referring to FIG. 2, FIG. 2 illustrates an example of how co-cast programming is multiplexed with regular digital programming. Program 1 or Packetized Elementary Stream 250, Co-Cast 1 or Packetized Elementary Stream 260, and Program 2 or Packetized Elementary Stream 270 are transmitted to Multiplexer 280 which combines the three packetized elementary streams into Single Transport Stream 290.

Figure 3:
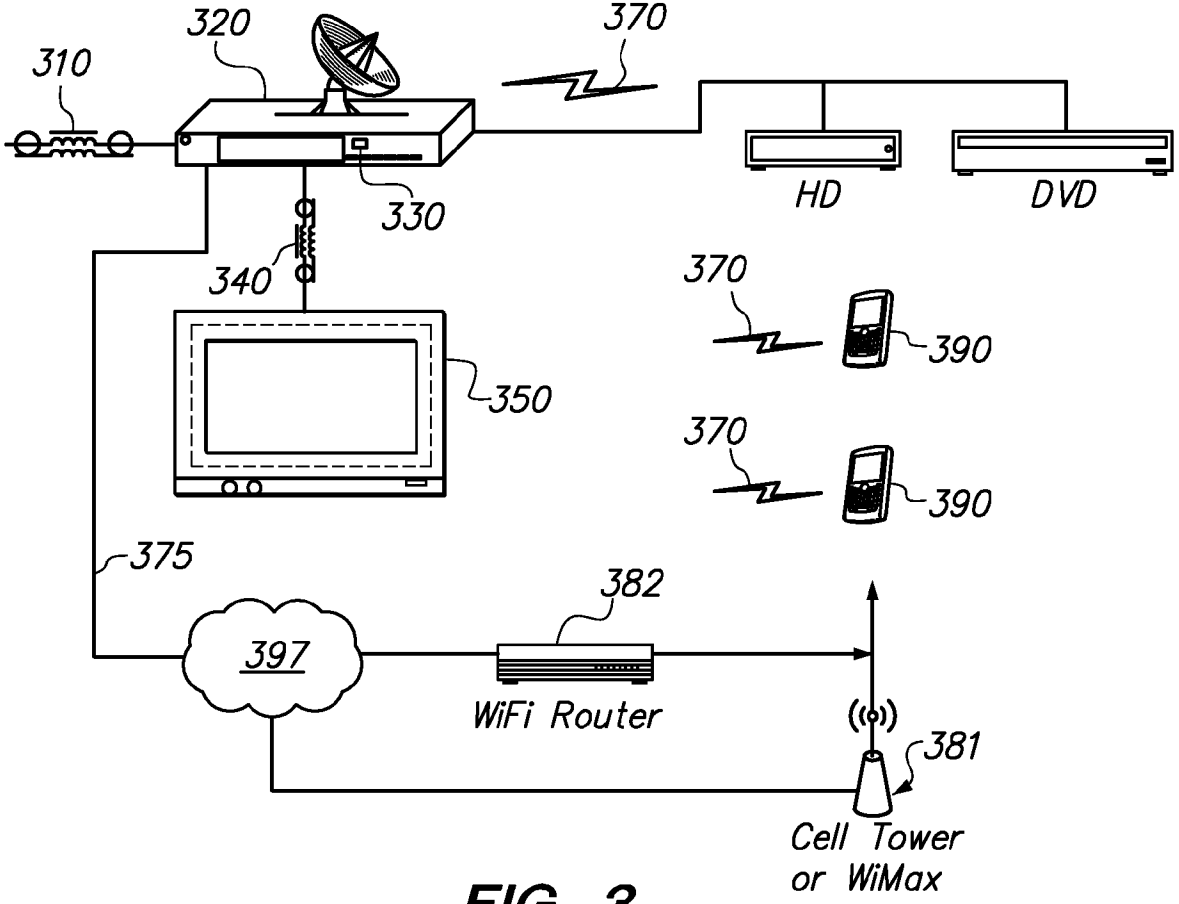
FIG. 3 illustrates multiple embodiments of the invention

Referring to FIG. 3, FIG. 3 illustrates multiple embodiments of the invention; STB 320 receives the content, in packetized form, via coaxial cable 310. STB 320 is wireless enabled to transmit and receive information via wireless communications such as infra-red, fast-infrared (FIR), Bluetooth, or 802.11x. STB 320 is also configured with two or more demultiplexers 330. Multiple demultiplexers allow different receiving devices to receive different content at the same time. One channel is transmitted via transmission means 340 to television set 350. One or more channels are transmitted wireless via wireless transmitter 360 over one or more bi-directional wireless channels 370, to one or more wireless devices 390. Each wireless device may receive different content up to the number of demultiplexers available (minus the demultiplexer being used by the television set). Such content can be streamed for real time decoding by the handheld device, or downloaded to devices with enough storage capabilities for later decoding or playback. Bi-directional channel 370 allows the hand held devices to request retransmission of corrupted packets from the STB 320, thus allowing rich media to be transmitted. Bi-direction channels 370 may represent diverse technologies, to wit, the STB 320 may transmit using one wireless technology, and receive information such as data or commands via another wireless technology. In addition, the invention can communicate via WiMax 381 or Wi-Fi router 382.

Figure 3A:
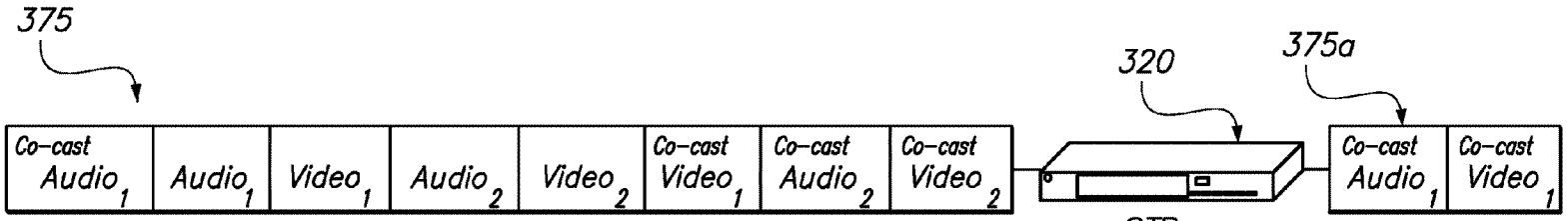
FIG. 3a illustrates one embodiment of the invention where the STB demultiplexes the requested co-cast programming from the Transport Stream for transmission.

Referring to FIG. 3a, FIG. 3a illustrates one embodiment of the STB, transmitting co-cast content to the handheld device. The STB receives Transport Stream 375, performs the demultiplexing and decoding on the incoming packet stream and broadcasts Transport Stream 375a which is composed solely of co-cast packets that were requested by each handheld device.

Figure 3B:
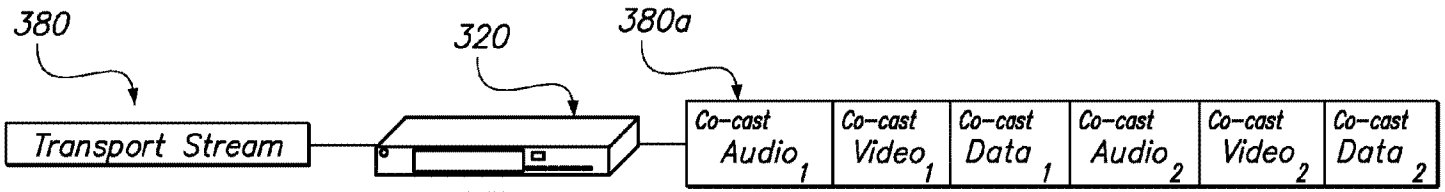
FIG. 3b illustrates one embodiment of the invention where the STB demultiplexes all co-cast programming from the Transport Stream for transmission.

Referring to FIG. 3b, FIG. 3b illustrates a second embodiment of the STB transmitting co-cast content to the handheld device. STB 320 acts as a router, and broadcasts all packets from Transport Stream 380 which are identified as co-cast packets into Transport Stream 380a. Each hand held device performs its own demultiplexing and decoding of the packetized stream. This method permits the user view all co-cast content, whether associated with a particular channel or not.

Figure 3C:
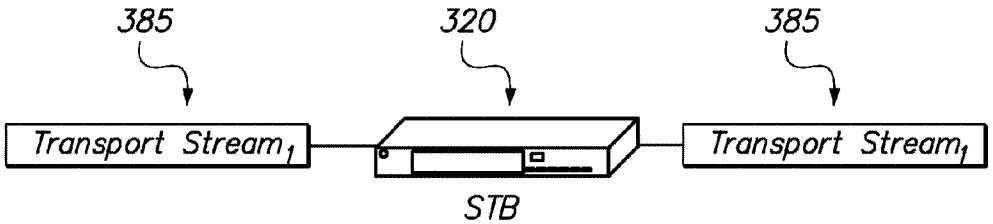
FIG. 3c illustrates one embodiment of the invention where the STB re-transmits the entire Transport Stream.

Referring to FIG. 3c, FIG. 3c illustrates yet another embodiment of the STB transmitting co-cast content to the handheld devices. In this embodiment, the STB 320 merely rebroadcasts Transport Stream 385 as received. Each hand held device would be responsible for processing the entire packetized stream and performing demultiplexing and decoding as necessary. This method is suboptimal in that it requires each handheld device to have a demultiplexer as powerful as the one in STB 320, which would substantially increase the cost of each handheld device Referring again to FIG. 3, FIG. 3 further refers to another embodiment of the invention. STB 320 received the content via coaxial cable 310. STB 320 extracts Co-cast identification information from the requested packets. This co-cast identification, information includes, but is not limited to a list of titles and locations of the co-cast content. The location may be the internet, another network, the packetized content being received by the coaxial cable 310, cached on STB 320, or from a mass storage device attached to STB 320. STB 320 is wireless enabled. Examples of the extracted co-cast index information include, Internet URL's, DVD title, chapter, and time index information, Hard drive file location, etc. The co-cast index information is transmitted to one or more wireless devices 390 via wireless transmitter 360. Each wireless device 390 receives the identical list of co-cast content.

Wireless device 390 is wirelessly connected to both STB 320, the internet via Router 382, or Tower 381, where Tower 381 can be a cell tower or a WiMax tower. The user selects the desired content to be co-cast and hand held device 390 uses the co-cast index information to obtain the desired content.

Referring yet again to FIG. 3, in another embodiment of the invention, STB 320 is connected to the public internet 397 via connection means 375. This permits STB 320 to obtain and transmit information from the internet as well.

Referring yet again to FIG. 3, in another embodiment of the invention, STB 320 receives content from a mass storage device such as a hard drive, an optical drive, or a solid state memory device.

Figure 4:
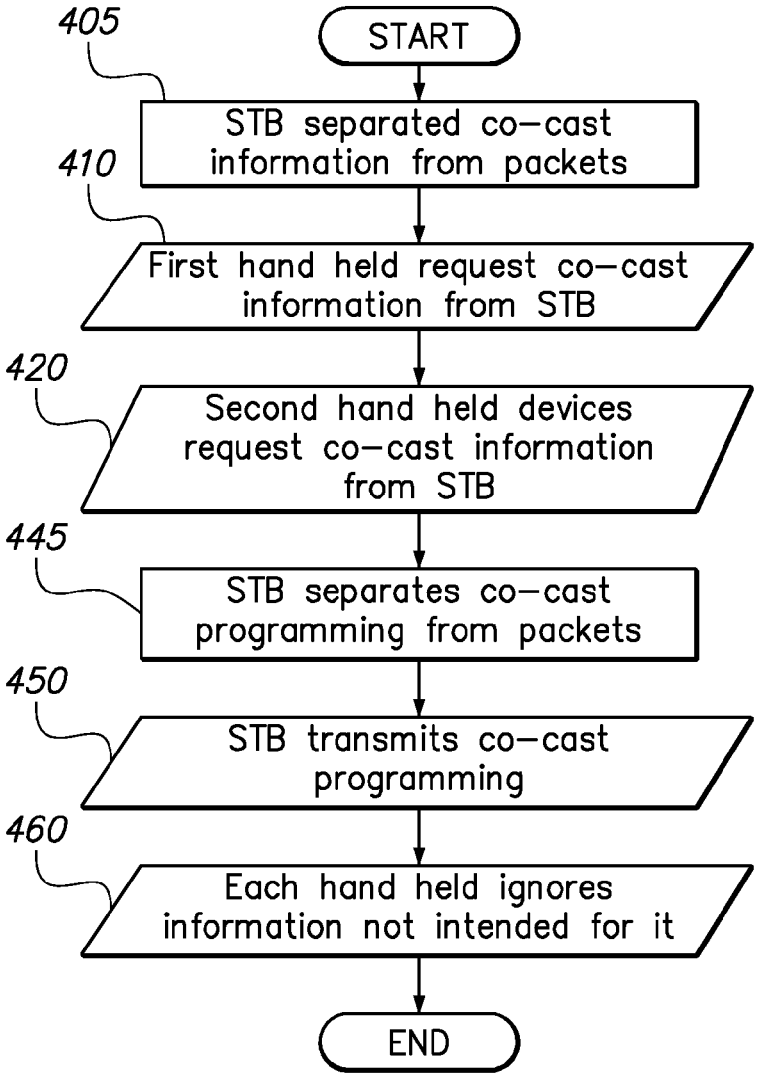
FIG. 4 is a flow diagram on one embodiment of the invention

Referring to FIG. 4, FIG. 4 is a flow diagram of one embodiment of the invention. At step 405, the STB broadcasts the list of available content by reading the payload of the Co-cast Content Association Table. At step 410 a first hand held device requests co-cast content associated with the currently viewed television channel from the STB. At step 420 a second hand held device simultaneously requests globally available co-cast content from the STB. At step 445 one or more demultiplexers separate the requested co-cast information from the packetized stream and broadcasts one or more transport streams. At step 450, the STB transmits the co-cast information to the wireless handheld devices. At step 460 each hand held device receives the transmitted data, ignore the packets not intended for it, and reconstructs the content.

Figure 5:
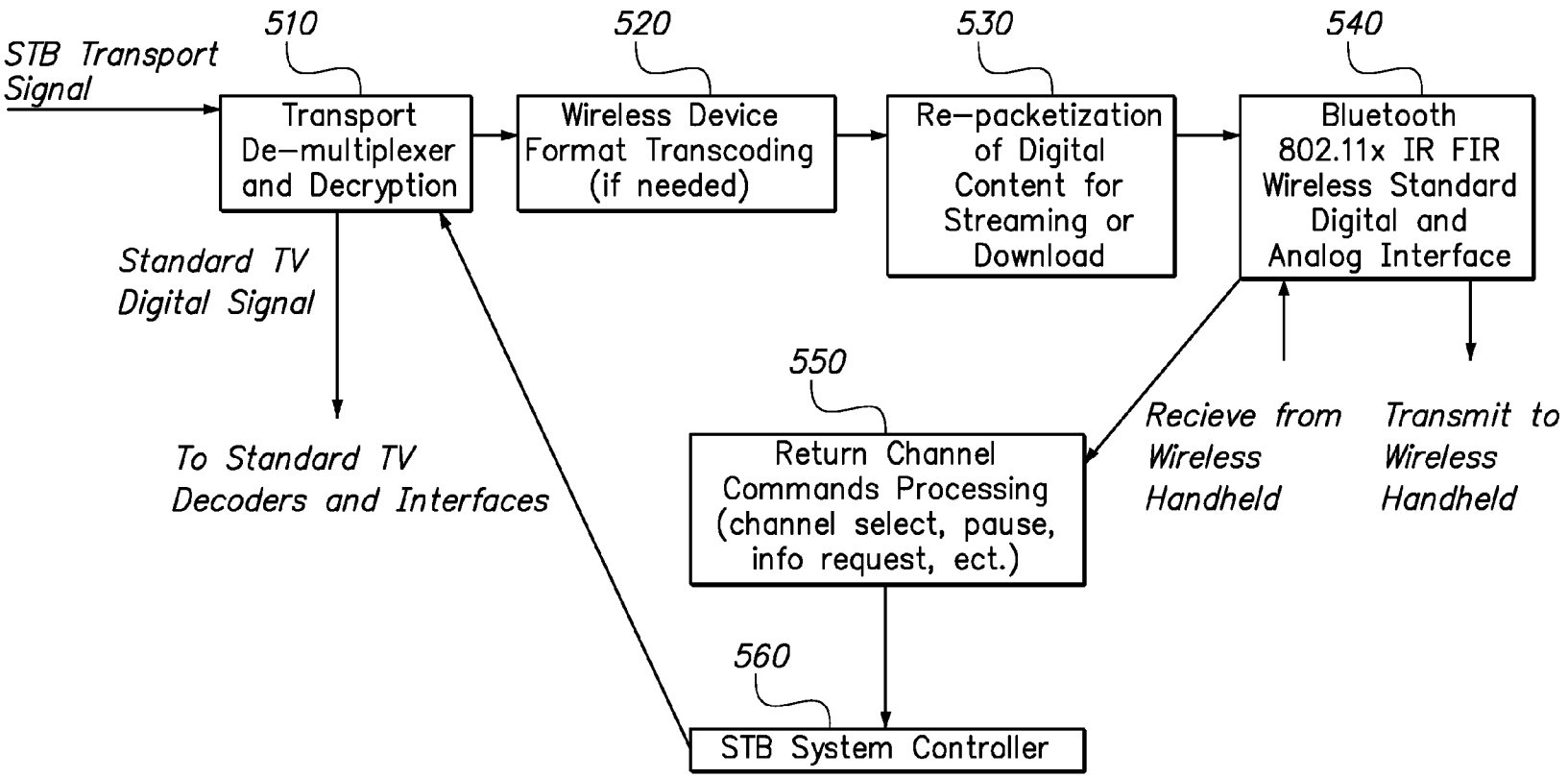
FIG. 5 illustrates the control logic

Referring to FIG. 5, FIG. 5 illustrates a block diagram of the control logic of the STB. At step 510, the STB send the input signal through a de-multiplexer and decryption device. At step 520, the STB transcodes the signal into the format for the wireless device. At step 530, the signal is re-packetized for streaming or downloading. At step 540, the signal passes through the wireless interface. At step 550, the STB processes the return channel commands. At step 560 the system controller will instruct the transport demultiplexer 510 to extract the co-cast channel requested by the hand held device.

The invention claimed is:

1. A method [for] *of* delivering [program] *content* from a content provider to one or more [hand held] *handheld* wireless devices via a set top box (*STB*), *the method* comprising [the steps of]:

[said] *the* STB [receives] *receiving* a transport stream[.] *from the content provider;*

[said] *the* STB [operable to recognize co-cast programming] *recognizing Co-Cast information* in [a] *the* transport stream, *wherein the co-cast information comprises a Co-Cast Content Association Table that identifies a list of co-cast programming for playback on the one or more handheld wireless devices other than a television*;

[said] *the* STB demultiplexing [out a] *the* Co-Cast Content Association Table[; said Co-Cast Content Association Table containing a list of all co-cast programming available] *from the transport stream*;

[said] *the* STB [wirelessly broadcasting] *transmitting* to *the* one or more [hand held] *handheld* wireless devices *information corresponding to the list of co-cast programming available to the one or more handheld wireless devices identified by* the Co-Cast Content Association Table[, where each hand held wireless device displays the list of available co-cast programming];

[selecting on said hand held wireless device one program; said hand held device transmitting the program request to the STB;]

[said] *the* STB receiving [one or more requests] from *the* one or more [hand held] *handheld* wireless devices *one*

*or more requests identifying co-cast programming among the list of co-cast programming available to the one or more handheld devices*;

[said] *the* STB [further] demultiplexing [out] *from the transport stream* the [requested] co-cast programming *identified by the one or more requests;* and

[re-multiplexes] *the STB multiplexing* the [requested] co-cast programming *demultiplexed from the transport stream* into a *co-cast* transport stream and [broadcasting said] *transmitting the* co-cast [programming] *transport stream* to [each of] the [requesting hand held] *one or more handheld* wireless devices,

*wherein the co-cast programming is audio/video (A/V) content.*

2. The method of claim 1 [where], *wherein* the co-cast information is associated with a specific television program.

3. The method of claim 1 [where], *wherein* the co-cast information is not associated with a specific television program.

4. The method of claim 1 [where], *wherein* the co-cast information [was] *is* introduced into the transport stream in [the] *a* native format of the [hand held wireless device] *one or more handheld wireless devices.*

5. The method of claim 1 [where], *wherein* the [hand held] *one or more handheld* wireless devices transmit their native [format] *formats* to *the* STB, which re-encodes the requested co-cast [information] *programming* into the native format of the [destination hand held wireless device] *one or more handheld wireless devices*, [where said] *wherein the* native [format] *formats* may be different from [one hand held device to another] *each other.*

6. The [STB] *method* of claim 1 [where], *wherein* the STB is [capable of] *configured to* simultaneously [communicating] *communicate* with [more than one hand held wireless device] *the one or more handheld wireless devices.*

7. The [STB] *method* of claim 1 [where], *wherein* the STB outputs multiple single-program Transport [Stream] *Streams.*

8. The [STB] *method* of claim 1 [where], *wherein* the STB outputs a single multiple-program Transport Stream.

9. The [hand held device] *method* of claim 1 [where], *wherein* the [hand held device is the destination] *one or more handheld wireless devices are destinations* of the *co-cast* programming.

10. A method [for] *of* delivering [program] *content* from a content provider to one or more [hand held] *handheld* wireless devices via a set top box (*STB*), *the method* comprising [the steps of]:

[said] *the* STB [receives] *receiving* a transport stream[,] *from the content provider;*

[said] *the* STB [operable to recognize co-cast] *recognizing Co-Cast* programming in [a] *the* transport stream, *wherein the Co-Cast programming comprises a Co-Cast Content Association Table that identifies a list of co-cast programming for playback on the one or more handheld wireless devices other than a television*;

[said] *the* STB demultiplexing [out] the Co-Cast programming[, where said co-cast programming includes the Co-Cast Content Association Table] *from the transport stream*;

[said] *the* STB [re-multiplexes] *multiplexing* the [requested co-cast] *Co-Cast* programming into a *co-cast* transport stream[.]*;*

*the STB* wirelessly broadcasting to *the* one or more [hand held] *handheld* wireless devices the co-cast [programming, where each hand held wireless device demultiplexes out the Co-Cast Content Association Table, displays the list of available co-cast programming, selecting one co-cast program; said wireless handheld further demultiplexing out said requested co-cast programming from the received stream; decoding and displaying said co-cast programming] *transport stream,*

*wherein the co-cast programming is audio/video (A/V) content.*

*11. A system for delivering content, the system comprising:*

*a content provider configured to multiplex a transport stream, the transport stream comprising audio/video (AV) content, co-cast information, and co-cast content; and*

*a STB configured:*

*to receive the transport stream from the content provider,*

*to recognize the co-cast information in the transport stream, wherein the co-cast information comprises a Co-Cast Content Association Table that identifies a list of co-cast programming for playback on the one or more handheld devices other than a television,*

*to demultiplex the Co-Cast Content Association Table from the transport stream,*

*to transmit information corresponding to the list of co-cast programming available identified by the Co-Cast Content Association Table,*

*to receive one or more requests identifying co-cast programming among the list of co-cast programming available from the one or more handheld wireless devices,*

*to demultiplex from the transport stream the co-cast programming identified by the one or more requests,*

*to multiplex the co-cast programming demultiplexed from the transport stream into a co-cast transport stream, and*

*transmit the co-cast transport stream to the one or more handheld wireless devices,*

*wherein the co-cast programming is audio/video (A/V) content.*

*12. A set top box (STB) configured to deliver content from a content provider to one or more handheld wireless devices, the STB comprising:*

*a first receiver configured to receive a transport stream from the content provider, wherein the STB is configured to recognize co-cast information in the transport stream, wherein the co-cast information comprises a Co-Cast Content Association Table that identifies a list of co-cast programming for playback on the one or more handheld wireless devices other than a television;*

*a demultiplexer configured to demultiplex the Co-Cast Content Association Table from the transport stream;*

*a wireless communication interface configured to transmit to the one or more handheld wireless devices information corresponding to the list of co-cast programming available to the one or more handheld wireless devices identified by the Co-Cast Content Association Table and receive from the one or more handheld wireless devices one or more requests identifying co-cast programming among the list of co-cast programming available to the one or more handheld devices; and*

*a multiplexer configured to multiplex co-cast programming demultiplexed from the transport stream into a co-cast transport stream,*

*wherein the demultiplexer further is configured to demultiplex from the transport stream the co-cast programming identified by the one or more requests,*

*wherein the wireless communication interface is further configured to transmit the co-cast transport stream to the one or more handheld wireless devices, and*

*wherein the co-cast programming is audio/video (A/V) content.*

*13. The method of claim 1, wherein a header of the co-cast information comprises an identifier configured to identify a packet of the co-cast information as a co-cast packet.*

*14. The method of claim 1, wherein the one or more wireless devices are comprised of one or more of a laptop, a personal computer (PC), a personal digital assistant (PDA) and a mobile phone.*

*15. The method of claim 10, wherein a header of the co-cast information comprises an identifier configured to identify a packet of the co-cast information as a co-cast packet.*

*16. The method of claim 10, wherein the one or more wireless devices are comprised of one or more of a laptop, a personal computer (PC), a personal digital assistant (PDA) and a mobile phone.*

*17. The system of claim 11, wherein a header of the co-cast information comprises an identifier configured to identify a packet of the co-cast information as a co-cast packet.*

*18. The system of claim 11, wherein the one or more wireless devices are comprised of one or more of a laptop, a personal computer (PC), a personal digital assistant (PDA) and a mobile phone.*

*19. The STB of claim 12, wherein a header of the co-cast information comprises an identifier configured to identify a packet of the co-cast information as a co-cast packet.*

*20. The STB of claim 12, wherein the one or more wireless devices are comprised of one or more of a laptop, a personal computer (PC), a personal digital assistant (PDA) and a mobile phone.*

* * * * *